June 4, 1968 R. H. ADLHOCH ET AL 3,387,270

PULSE DECODER-ENCODER SYSTEM CONTROLLED BY PULSE AND DIGIT COUNTERS

Filed Jan. 15, 1965 2 Sheets-Sheet 1

Inventors
Richard H. Adlhoch & Ronald H. Chapman
By Mueller & Aichele
Attys.

Inventors
Richard H. Adlhoch & Ronald H. Chapman
By Mueller & Aichele
Attys.

United States Patent Office 3,387,270

Patented June 4, 1968

3,387,270

PULSE DECODER-ENCODER SYSTEM CONTROLLED BY PULSE AND DIGIT COUNTERS

Richard H. Adlhoch, Oak Lawn, and Ronald H. Chapman, Wheaton, Ill., assignors to Motorola, Inc., Franklin Park, Ill., a corporation of Illinois Filed Jan. 15, 1965, Ser. No. 425,749
7 Claims. (Cl. 340—164)

ABSTRACT OF THE DISCLOSURE

Combined encoder-decoder for responding to particular digital pulse code and for producing the same pulse code to identify a station. A pulse counter receives pulses and has stages selectively connected to stages of a digit counter to enable the same to respond to a particular received digital pulse code. A multivibrator applies regularly recurring pulses to the pulse counter for encoder operation, with the stages of the digit counter actuating a timer to interrupt the multivibrator to produce the code.

This invenion relates to digital selecting systems, and more particularly to a transistorized system for decoding and encoding a multiple digit calling code.

Digital signal codes have found application in many systems. For example, digital pulse codes are used in telephone systems to identify particular stations. In mobile radio telephone systems, space is at a premium and there is a requirement for a compact digital decoder and encoder which provides an indication at a mobile station when the calling code associated with the station is received, and which produces the digital code at the mobile station when such station makes a call, to identify the calling station for billing purposes and for other reasons. A system for decoding and encoding a calling code is described and claimed in United States Patent No. 3,080,547 assigned to Motorola, Inc., assignee of the present invention. This application is directed to a different system which has advantages in particular applications.

It is an object of the present invention to provide an improved transistorized digital decoder and encoder system.

Another object of the invention is to provide a transistorized multiple digit selective system for use in a mobile station of a radio telephone system for responding to a particular calling code signal, and for sending out the same signal to identify the mobile station.

Another object of the invention is to provide a digital decoder and encoder which is completely transistorized, and which is arranged so that the minimum number of stages is conducting at any one time, to thereby conserve power.

A feature of the invention is the provision of a pulse decoding and encoding system including a transistorized pulse counter for counting the pulses of each digit, a transistorized digit counter selectively coupled to the stages of the pulse counter to indicate when the number of pulses of each digit corresponds to a preset code, and a pulse source for applying pulses to produce the code, with the digit counter controlling the pulse source so that the pulses transmitted thereby form the preset code. Only the transistors of the stages of the pulse and digit counters which are activated at any particular time are energized to thereby conserve power.

A further feature of the invention is the provision of a digital decoder and encoder system including a pulse counter, a digit counter, an inter-digit timer and a pulse source, wherein the stages of the digit counter are connected to stages of the pulse counter corresponding to the digits of the code number to be selected, with each pulse counter stage providing a voltage to enable the digit counter stage connected thereto so that the digit counter steps from one stage to the next in response to pulses from the inter-digit timer, and the digit counter controls the application of pulses from the pulse counter to the inter-digit timer for controlling the pulse source to transmit pulses corresponding to the calling code.

The invention is illustrated in the drawings wherein.

The system of the invention operates with a train of pulses, such as pulses used in dial telephone operations, which form a code number. The pulses are provided in groups corresponding to the digits of the code number, with the groups being separated by a time interval greater than the time interval between the pulses of a group. The pulse train is applied to a pulse counter, with each pulse causing the counter to step from one stage to the next, and each pulse group energizing the stage of the counter corresponding to the number of the digit represented thereby. The pulses are also applied to an inter-digit timer which produces a pulse at the end of each pulse group and applies the same to the pulse and digit counters. The digit counter has a number of stages corresponding to the number of digits in the code number, and each stage is coupled to one stage of the pulse counter. Energization of a stage in the pulse counter enables the connected stage of the digit counter so that the digit counter will step from this stage to the next in response to a pulse from the inter-digit timer. The system is also used to provide a pulse train representing the code number which is set-up in the system. A multivibrator provides pulses to the pulse counter, and the stages of the digit counter enable connections from the pulse counter to the inter-digit timer so that when the number of pulses which have been set-up for each digit are applied the inter-digit timer clamps the multivibrator so that the train of pulses is interrupted. When the pulse groups for all of the digits are applied, the digit counter applies a signal to a control stage to again clamp the multivibrator. The code is transmitted by transmitting the pulses from the multivibrator.

Figure 1:
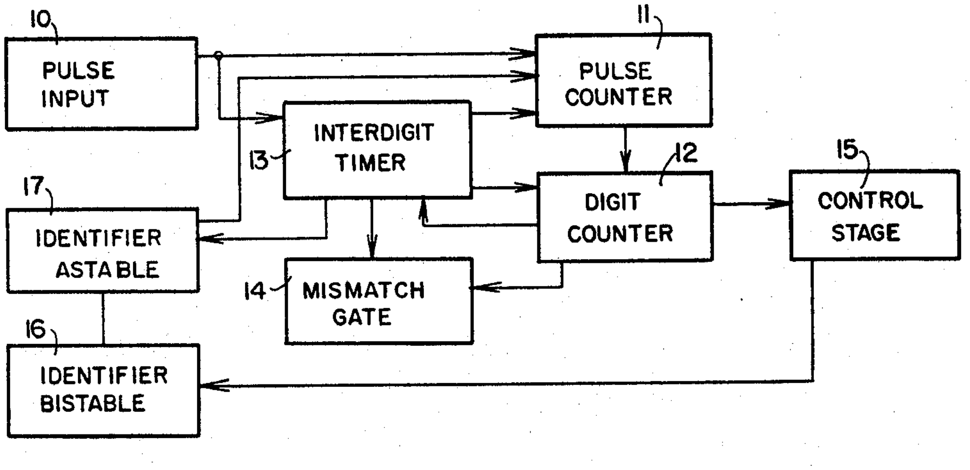
FIG. 1 is a block diagram of the selective system of the invention.

FIG. 1 is a block diagram showing the main components of the system of the invention, and the interconnections thereof. The pulse input 10 may be a circuit for receiving bursts of tones as transmitted over a radio system and converting the same into direct current pulses. The pulses from the input 10 are applied to pulse counter 11 and to inter-digit timer 13. The pulse counter has ten outputs corresponding to the ten possible numbers of each digit. The inter-digit timer responds to the pulses and when an interval greater than the interval between successive pulses of a group is received, a pulse is produced and applied to the pulse counter to reset the same. A pulse is also applied to the digit counter 12 to actuate the same.

The digit counter 12 includes a number of stages corresponding to the number of digits in the code number to be used. Each stage of the digit counter is connected to the stage of the pulse counter which corresponds to the number of the digit represented by the particular stage of the digit counter. The digit counter will step from one stage to the next in response to pulses from the inter-digit timer, provided the stages of the pulse counter to which the digit counter stages are connected, are then energized. This action is provided by a coupling circuit in each digit counter stage which prevents the stage from being actuated until a voltage is received from the pulse counter stage to which it is connected.

As an example, assume that the first digit of the code number is three, the first stage of the digit counter will then be connected to the third stage of the pulse counter. This pulse counter will be activated in response to three pulses to energize the coupling circuit of the first stage of the digit counter, so that this stage will be actuated when the inter-digit timer generates a pulse. If there is a mismatch, the coupling circuit wil lnot activate the next stage and all of the digit stages are de-energized and the digit counter is reset. When a match occurs in all stages of the digit counter, the counter 12 actuates control stage 15 to actutae a ringing device or the like, to indicate that the code number which is set up has been received.

The system of FIG. 1 also acts as an encoder to provide a coded pulse train which represents the code number for which the selective system is set-up. This action takes place by operation of the identifier astable 17, which is a multivibrator which provides a continuous pulse train unless it is clamped to prevent multivibrator action. Pulses from the identifier astable 17 are applied to the pulse counter 11. The number of pulses corresponding to the first digit of the code number energize the corresponding stages of the pulse counter.

The first digit counter stage enables the selected pulse counter stage to apply a pulse to the inter-digit timer which clamps the identifier astable. In the example given, when three pulses are applied to the pulse counter, the third stage thereof will be actuated. The first stage of the digit counter applies the pulse from this stage to initiate operation of the inter-digit timer. This holds the astable 17 inactive to provide the inter-digit interval after the first pulse group.

After the inter-digit interval, the inter-digit timer relaxes and applies a pulse to reset the pulse counter and to advance the digit counter to the next stage. The identifier astable 17 is then released and applies additional pulses to the pulse counter 11. This time the pulse counter counts until the stage corresponding to the second digit is energized. The second stage of the digit counter couples this stage of the pulse counter to the inter-digit timer to stop the identifier astable 17. This action continues until the pulse group for the last digit actuates the control stage 15 and a signal is applied therefrom to the identifier bistable 16 which clamps the identifier astable 17. The identifier bistable 16 is held in the condition to clamp the identifier astable 17 until it is again desired to provide a pulse train corresponding to the code number which is selected by the system. This pulse code can be used to identify the station.

Figure 2:
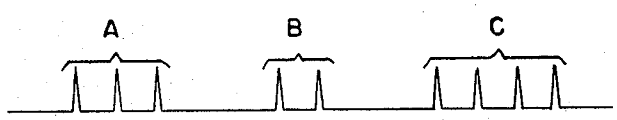
FIG. 2 illustrates the pulses of a code number as used in the system.
Figure 3:
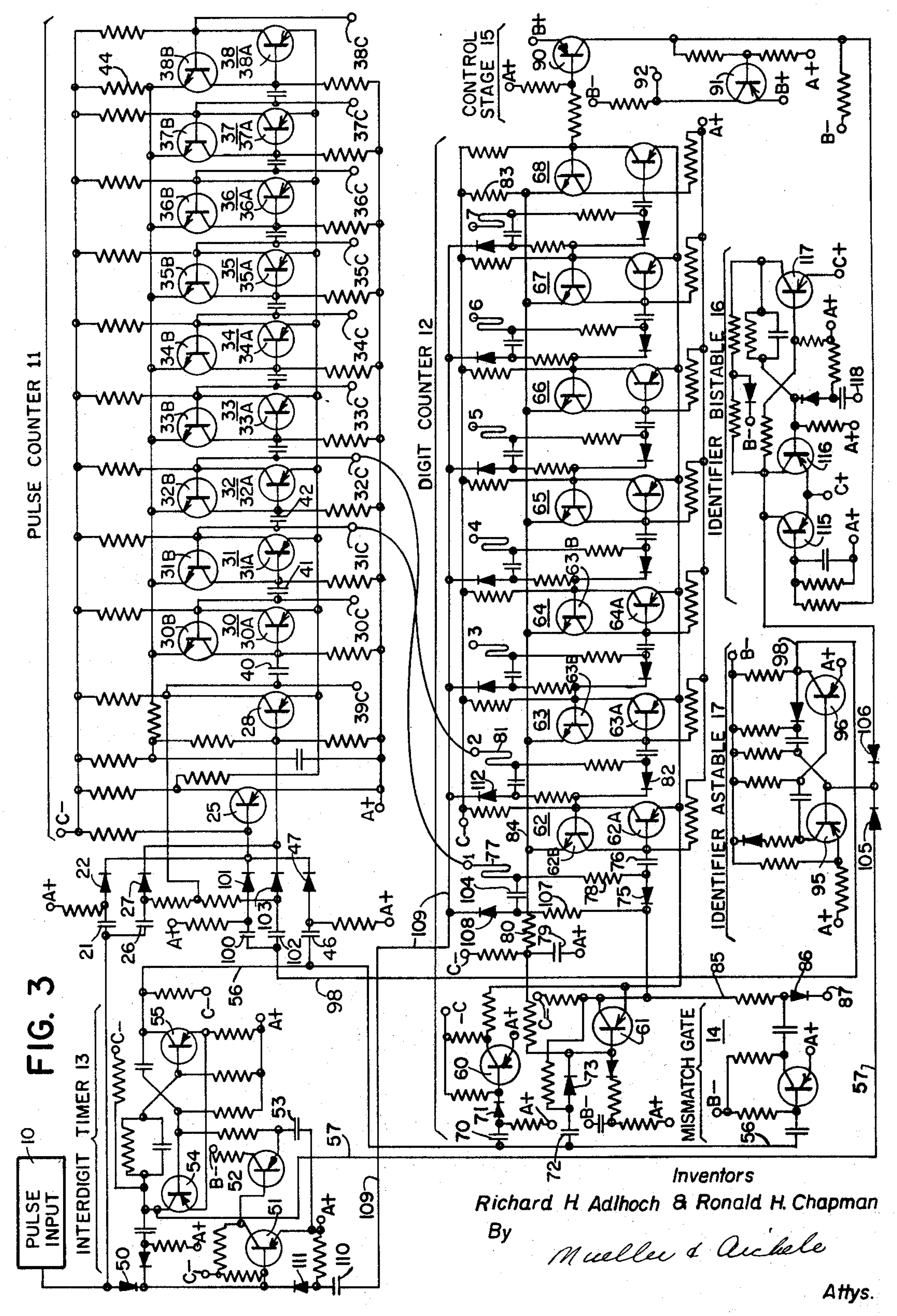
FIG. 3 is a circuit diagram of the system for providing both decoding and encoding action.

The circuit diagram for the digital decoding system for responding to the telephone type pulse codes, and for producing such a code, is shown in FIG. 3. The pulse input circuit 10 may include circuits responsive to pulses of tones of various frequencies to provide a direct current pulse train corresponding to the digits of a code call. This is represented in FIG. 2 wherein the first group A of three pulses represents the first digit "3," the second group B of signal pulses represents the second digit "2," and the third group C of four pulses represents the third digit "4." The circuit of FIG. 3 includes provisions for code numbers having seven digits. It will be apparent that the interval between the pulses of the groups forming the digits is substantially greater than the interval between the pulses of a single digit group.

The pulses from input circuit 10 are applied through capacitor 21 and rectifier 22 to the base electrode of transistor 25 which forms the drive amplifier of the pulse counter 11. The input pulses are also applied through capacitor 26 and diode 27 to the base electrode of transistor 28 of the pulse counter 11. Transistor 28 is connected in a reset circuit. Transistors 25 and 28 are each cut off by an input pulse, but the coupling circuits are selected to provide time constants such that transistor 28 is cut off for a longer time than transistor 25.

The pulse counter has nine pulse counting stages designated 30 to 38 respectively. Each stage has a pair of transistors connected in a regenerative circuit, and designated by numerals designating the stage, with the letters A and B being used to indicate the individual transistors. When the transistors 25 and 28 are cut off, a negative voltage is applied from the collector of transistor 25 to the emitter of transistor 30A of the first stage 30, and to the A transistor of each of the other counter stages. This holds all the A transistors cut off. Cut off of transistor 28 provides a negative pulse from the collector thereof through capacitor 40 to the base of transistor 30A. This tends to turn on the transistor 30A but because of the negative potential at its emitter it cannot turn on until transistor 25 becomes conducting to remove the negative potential at the emitter of transistor 30A. As previously stated, transistor 28 will be cut off for a longer period than transistor 25 in response to each received pulse, so that the pulse applied to the base of transistor 30A to turn on this transistor continues after the negative potential at its emitter is removed. This renders the collector of transistor 30A positive to turn on transistor 30B, and the collector of transistor 30B is coupled to the base of transistor 30A to render transistor 30A more conducting. This regenerative action causes the transistors 30A and 30B to become fully conducting very rapidly.

When transistors 30A and 30B are conducting, the positive potential at the collector of transistor 30A and at the base of transistor 30B is applied to terminal 30C. Terminal 30C as well as the corresponding terminals of the other pulse counter stages are selectively connected to the stages of the digit counters as will be explained. All of the B transistors are connected through a common resistor 44, which applies drive potential to the base of reset transistor 28. When transistor 30B, or any of the B transistors conducts, the drive is removed from transistor 28 so that the reset action is disabled.

When the next pulse is received, transistor 25 is again cut off. The negative pulse applied from the collector of transistor 25 to the emitter of transistor 30A cuts off the transistor 30A so that a negative pulse is coupled through capacitor 41 to the base of transistor 31A of the next counter stage. This causes the transistor 31B to be conducting through the regenerative connection which has been described previously. The third received pulse cuts off transistor 25 again to cut off the stage 31 so that a pulse is applied through a capacitor 42 to the transistor 32A of the third counter stage. This stage is rendered rapidly conducting by action of transistors 32A and 32B as previously described. It will be apparent that the remaining stages 33, 34, 35, 36, 37 and 38 will be actuated when pulses up to 9 are applied. When ten pulses are received there is no further stage to be actuated and all of the regenerative stages are off. Resistor 44 therefore applies a drive voltage to the base of transistor 28 so that this transistor conducts and provides a positive potential at terminal 39 which forms the "0" terminal of the counter.

The pulses from the pulse input 10 are also applied through the diode 50 to the inter-digit timer 13. The inter-digit timer includes a first transistor 51 which serves as a pulse amplifier, a second transistor 52 which drives an integrator, and transistors 54 and 55 which are connected in a Schmitt trigger circuit. The inter-digit timer becomes activated by a positive pulse from the pulse input, or from a positive pulse from the digit counter 12. Input pulses applied through diode 50 to the base of transistor 51 cut off this transistor so that a negative pulse is produced at the collector and applied to the base of transistor 52. This causes the emitter of collector 52 to go negative to charge capacitor 53 to turn on the Schmitt trigger circuit. As long as pulses are received, capacitor 53 remains charged and the Schmitt trigger circuit is held in operative condition. When pulses are interrupted between digits, transistor 51 is rendered conducting and transistor 52 is cut off. This permits capacitor 53 to slowly discharge. The values are selected so that after a time interval of 190 milliseconds the charge on capacitor 53 is reduced to a level to turn off the Schmitt trigger circuit. A positive pulse is then developed at the collector of transistor 55 and applied through conductor 56 to pulse counter 11, digit counter 12 and mismatch gate 14.

The pulse on conductor 56 at the end of each digit is applied through the capacitor 46 and diode 47 to the base of transistor 25 of the pulse counter. As previously stated, this cuts off transistor 25 so that a negative voltage is applied from its collector to the emitter electrode of transistor 28 and to the emitter electrode of all the A transistors of the pulse counter stages. This pulse acts to reset the pulse counter so that it is ready to receive pulses for the next digit. The duration of this pulse is long enough to keep the transfer between stages from taking place and reset occurs.

The digit counter includes transistor 60 which functions as a drive amplifier, transistor 61 in the reset stage and stages 62, 63, 64, 65, 66, 67 and 68. As previously stated, the seven stages of the digit counter are for determining a match of the seven digits of a code signal. The stages 62 to 68 inclusive are generally similar to the stages 30 to 38 of the pulse counter. The output of the inter-digit timer on conductor 56 is applied through capacitor 70 and diode 71 to the base electrode of drive transistor 60, and through capacitor 72 and diode 73 to the base electrode of reset transistor 61. The signal applied to the drive transistor cuts off this transistor so that a negative signal is developed at the collector, and is coupled to the emitter electrodes of transistor 61, and of the A transistors of counter stages 62 and 68 inclusive. This pulse also cuts off transistor 61 to provide a negative pulse at its collector which is connected through diode 75 and capacitor 76 to the transistor 62A of the first counter stage. However, diode 75 is normally non-conducting to prevent application of this pulse to the first counter stage.

Each counter stage has a conductor selectively connected to one of the outputs 30C to 38C and 39 of the pulse counter. As previously stated, these outputs are energized in accordance with the number of pulses applied to the pulse counter. Stage 62 of the digit counter represents the first digit, and is shown connected to the third stage of the pulse counter to respond to a code having three as the first digit. As previously stated when three pulses are applied to the pulse counter, the stage 32 will be activated so that the potential of the collector of transistor 32A is positive. The collector of transistor 32A is connected to terminal 32C which is connected to conductor 77 of stage 62 of the digit counter. The positive potential at terminal 32C is applied through resistor 78 to diode 75 enabling the diode to conduct. Accordingly, the negative potential from the collector of reset transistor 61 is applied through diode 75 and capacitor 76 to the base of transistor 62A. Transistor 62A, however, remains cut off since its emitter is biased negative by the signal from the collector of drive transistor 60. When the pulse applied to the base of transistor 60 terminates, the negative potential from the collector of transistor 60 is removed. This will allow transistor 62A to conduct, and will cause transistor 62B to conduct, so that the stage 62 is activated. Transistors 62A and 62B are connected in a regenerative circuit previously described in connection with transistors 30A and 30B.

The pulse applied from the inter-digit timer 13 to the base electrode of transistor 61 holds the transistor 61 turned off for an interval after stage 62 is rendered conducting. During this time capacitor 79 discharges through resistor 80 and transistor 62B to remove the drive from the base of transistor 61 and the positive potential on line 84 continues to hold transistor 61 cut off as long as any stage of the digit counter 12 is conducting. This disables the reset action.

After the second digit of the code signal is received, the inter-digit timer 13 again applies a pulse to drive transistor 60. The second stage 62 of the digit counter is connected to the second stage 31 of the pulse counter to respond to a code number in which the second digit is "2." In the event that a code match occurs from the second pulse group, a positive potential is applied from the terminal 31C of the second stage of the pulse counter to conductor 81 to render diode 82 conducting. This applies the negative pulse from stage 62 through diode 82 to the A transistor of the digit counter stage 63.

In the event that the number of pulses received for the second digit differ from the code, a mismatch condition exists. In such case the diode 82 is reverse biased so that the negative pulse prevents the second stage from being turned on. Capacitor 79 then charges negative through resistors 80 and 83 and turns on transistor 61. With transistor 61 conducting, all of the other digit counter stages are biased off. This resets the digit counter and the pulse counter has been reset by the pulse from the inter-digit timer 13, so that the selector is ready for a new selecting operation.

In the event that a code match is obtained for all of the digits of a code number, the stages 62 to 68 of digit counter 12 will be rendered conducting in turn. Conduction of the last stage 68 applies a positive signal to the base of control transistor 90 so that this transistor is turned off. This provides a negative voltage at the collector of transistor 90. This voltage is applied to the base of a second control transistor 91 to turn on the transistor 91 so that a positive potential appears at the terminal 92 connected to the collector of transistor 91. These potentials may be used to actuate various equipment such as the ringer in a telephone system which indicates that the proper code signal has been received.

When a mismatch occurs, and the inter-digit timer relaxes after completion of a pulse group, the voltage applied from the inter-digit timer 13 to the mismatch gate 14 on line 56 causes an output from the mismatch gate which may be utilized to provide the desired operation of equipment. Action of the mismatch gate 14 in response to the voltage from the inter-digit timer 13 is inhibited when a match condition exists, by the potential applied from conductor 85 connected to the reset transistor 61. This is a negative signal which is applied to diode 86 to prevent it from conducting. However, when a mismatch condition exists, the negative potential is removed from conductor 85 by conduction of transistor 61, so that the diode 86 conducts and transfers the pulse from the inter-digit timer to the output terminal 87.

The digital selective circuit described can also be used to transmit the code signal to which it is set up. For this operation, the identifier astable 17 is used. This circuit includes transistors 95 and 96 connected in a multivibrator circuit operating to provide recurring pulses. The circuit may provide a pulse of 25 milliseconds duration every 50 milliseconds. Pulses from the astable 17 are applied to conductor 98 and through capacitor 100 and diode 101 to the base of drive transistor 25 of the pulse counter 11. These pulses are also applied through capacitor 102 and diode 103 to the base of transistor 28. The applied pulses cause energization of the pulse counter stages in turn. While the pulses for the first digit are received, diode 108 of the digit counter is rendered conducting by the positive potential applied through resistor 107 from the collector of transistor 61. This applies the pulse from the third pulse counter stage 32 from conductor 77 through capacitor 104, and diode 108 to conductor 109, and through capacitor 110 and diode 111 to the base of transistor 51 of the inter-digit timer. This initiates action of the timer to provide the 190 millisecond interval between the pulses of succeeding digits. A regenerative coupling is provided from the collector of transistor 54 to the base of transistor 51 to stabilize this action.

The inter-digit timer 13 when activated applies a positive voltage from the collector of transistor 54 to conductor 57, and through diode 105 to the base of transistor 95 to clamp the astable 17 in the cut off position. At the end of the inter-digit interval, the positive signal is removed from the base of transistor 95 and the astable 17 starts oscillating to provide pulses for the second digit. The voltage from the inter-digit timer 13 on conductor 56 has also actuated the digit counter 12 so that the stage 62 thereof is energized, as has been described. This renders diode 112 conducting to transfer the pulse from the second pulse counter stage 31, applied to the conductor 81, to conductor 109 and to the inter-digit timer 13. This sequence is repeated for all of the digits until pulses from the seventh digit have been applied by the identifier astable 17.

The identifier astable 17 is also controlled by the identifier bistable 16 which includes transistors 115, 116 and 117. Transistors 116 and 117 form a bistable multivibrator circuit with transistor 116 biased into saturation and transistor 117 into cutoff. Under such conditions a positive inhibit signal is fed from the collector of transistor 116 through diode 106 to clamp the identifier astable 17. When it is desired to send the identification code, a positive pulse is applied to terminal 118, and is coupled to the base of transistor 116 to cause the identifier bistable to change state. This removes the positive inhibit signal applied from the collector of transistor 116 to the astable 17, so that the astable will oscillate. The identifier astable then operates under control of the inter-digit timer until the identification code is produced, as has been described.

At the end of the seventh digit, stage 68 of the digit counter applies a positive signal to the base of transistor 90. This cuts off transistor 90 and the negative pulse at its collector is coupled to the base of transistor 115 of the identifier bistable. This causes transistor 115 to be saturated to provide a positive signal at its collector which is applied through diode 106 to clamp the identifier astable 17, so that it will stop oscillating.

The system of the invention has been found to be highly satisfactory both as a decoder and as an encoder. The pulse counter and digit counter circuits include stages having transistors which are non-conducting with only the transistors of the one stage which is activated being conducting. This results in minimum current drain and is to be contrasted to stages having two transistors, one of which is always conducting.

Although the system is described with nine pulse counter stages and seven digit counter stages so that code numbers having seven digits can be used, and any number can be used for any digit, a system may be provided in accordance with the invention wherein different numbers of stages are provided in the pulse and digit counters. The number of stages in the pulse and/or the digit counters can be reduced in a system which requires only a small number of different codes. The maximum number of different codes can be provided by the least number of stages in a system wherein the pulse counter has the same number of stages as the digit counter.

The system is arranged so that the code number can be easily set up, with it being necessary to establish only one connection for each digit of the code number to be used. Any selector can be set to any code number so long as the digit counter has as many stages as there are digits in the code number. If a code number is to be used with fewer digits than the number of stages in the digit counter, it is merely necessary to connect the last stage used to the control transistor 90.

We claim:

1. A digital selective system for producing a plurality of pulse groups representing the digits of a particular code number and for responding to the groups of pulses of the particular code number, said digital system including in combination, a pulse counter including a plurality of stages actuated in turn in response to pulses applied thereto, timer means for resetting said pulse counter at the completion of each group of pulses, a digit counter having a number of stages corresponding to the number of digits in the code number, means for connecting said stages of said digit counter individually to particular stages of said pulse counter representing the digits of the particular code number, said stages of said digit counter being enabled in response to actuation of the pulse counter stages coupled thereto, said timer means applying a pulse to said digit counter after each group of pulses, said digit counter responding to the application of a pulse from said timer means to cause operation of the next stage thereof in the event that such stage has been enabled, input means for selectively applying regularly recurring pulses and pulse groups representing code numbers to said pulse counter, said stages of said digit counter being connected to said timer means to operate the same in response to the correct numbers of pulses for the corresponding digits, said timer means being connected to said input means for interrupting the regularly recurring pulses to provide pulse groups having intervals therebetween to form the particular code number, and control means connected to said digit counter and operated thereby in response to the last pulse group of the particular code number.

2. A digital system for responding to a code number represented by a plurality of groups of pulses corresponding to the digits of a particular code number, and for producing pulse groups representing the particular code number, said digital system including in combination, a pulse counter including a plurality of stages energized in turn in response to pulses applied thereto, input means for applying the groups of pulses representing a code number to said pulse counter, timer means for resetting said pulse counter after each group of pulses is applied thereto, a digit counter having a number of stages corresponding to the number of digits in the code number, means for connecting said stages of said digit counter individually to particular stages of said pulse counter representing the digits of the particular code number, said timer means applying a pulse to said digit counter after each group of pulses, said stages of said digit counter being energized in turn in response to energization of the pulse counter stages coupled thereto and to the application of a pulse from said timer means to said digit counter, control means coupled to the last stage of said digit counter and actuated in response to the receipt of successive pulse groups representing the digits of said particular code number, and multivibrator means applying regularly recurring pulses to said pulse counter, each of said stages of said digit counter applying a voltage from the connected pulse counter stages to said timer to actuate the same in response to the number of pulses represented by said connected pulse counter stage, said timer means being connected to said multivibrator means for interrupting operation of the same to provide an interval between pulse groups, said control means acting to interrupt operation of said multivibrator means after the pulses of the last pulse group of the code number have been applied to said pulse counter.

3. A digital selective system for responding to a code number represented by a plurality of pulse groups corresponding to the digits of a particular code number, and for producing pulse groups representing the particular code number, said digital system including in combination, a multistage pulse counter, means for applying the pulses of pulse groups representing the digits of the code number to said pulse counter in sequence, said stages of said counter being actuated in turn by the pulses of each group, a digit counter having a number of stages corresponding to the number of digits in the code number, each of said stages of said digit counter including selectively operated input coupling means for receiving a pulse to energize said stage, said coupling means of each of said stages of said digit counter being connected to one stage of said pulse counter, each of said pulse counter stages when energized applying a voltage to the connected coupling means of said digit counter stage to render the same operative, and timer means connected to said digit counter and to said pulse counter for applying pulses thereto after each group of pulses for actuating said digit counter and resetting said pulse counter, means for applying regularly recurring pulses to said pulse counter, said coupling means of said digit counter stages coupling the connected stages of said pulse counter to said timer means for actuating the same in response to groups of pulses corresponding to the digits of the particular code number, and means coupling said timer means to said pulse applying means for interrupting operation thereof to provide intervals between the pulse groups representing the digits of the code number.

4. A digital system for responding to a code number represented by a plurality of pulse groups corresponding to the digits of a particular code number, and for producing pulse groups representing the particular code number, said digital system including in combination, a multistage pulse counter, means for applying to said pulse counter in sequence the pulse groups representing the digits of the code number, said stages of said counter being energized in turn by the pulses of each group, a digit counter having a number of stages corresponding to the number of digits in the code number, each of said stages of said digit counter including selectively operated input coupling means for receiving a pulse to energize said stage, said coupling means of each of said stages of said digit counter being connected to one stage of said pulse counter, each of said pulse counter stages when energized applying a voltage to said coupling means of said digit counter stage connected thereto to render the same operative, and timer means connected to said digit counter and to said pulse counter for applying pulses thereto after each group of pulses for actuating said digit counter and resetting said pulse counter, so that the stages of said digit counter are energized in turn in response to pulse groups representing the respective digits of the particular code number determined by the connection of said stages of said pulse counter to said coupling means of said stages of said digit counter, multivibrator means for applying regularly recurring pulses to said pulse counter, means connecting said coupling means of said digit counter stages to said timer means, said stages of said digit counter causing said coupling means to apply pulses from the connected pulse counter stages to said timer means for actuating the same in response to groups of pulses corresponding to the digits of the particular code number, means coupling said timer means to said multivibrator means for interrupting operation of said multivibrator means to provide intervals between the pulse groups representing the digits of the code number, and means coupling the last stage of said digit counter means to said multivibrator means for interrupting said multivibrator means in response to completion of the pulse groups of the code number.

5. A digital encoder system for producing a plurality of groups of pulses in sequence corresponding to the digits of a particular code number, said encoder system including in combination, a pulse counter including a plurality of stages energized in turn in response to pulses applied thereto, means applying regularly recurring pulses to said pulse counter, a digit counter having a number of stages corresponding to the number of digits in the code number, means for connecting said stages of said digit counter individually to particular stages of said pulse counter which correspond to the digits of a particular code number, timer means connected to said pulse applying means, each of said stages of said digit counter applying a voltage from the connected stage of said pulse counter to said timer means for actuating the same in response to the number of pulses represented by said connected pulse counter stage, said timer means being coupled to said pulse applying means and responding to said voltage to interrupt operation of said pulse applying means to provide an interval between pulse groups.

6. A digital encoder system for producing a plurality of pulse groups in sequence corresponding to the digits of a particular code number, said encoder system including in combination, a multistage pulse counter, means for applying regularly recurring pulses to said pulse counter, said stages of said pulse counter being energized in turn by said pulses, a digit counter having a number of stages corresponding to the number of digits in the code number, each of said stages of said digit counter having coupling means selectively connected to one stage of said pulse counter, and timer means for applying pulses to said pulse counter and said digit counter after each group of pulses for resetting said pulse counter and for stepping said digit counter, means connecting said coupling means of said digit counter stages to said timer means, said stages of said digit counter when actuated acting to apply pulses from the connected pulse counter stage to said timer means for actuating the same in response to groups of pulses corresponding to the digits of the particular code number, means coupling said timer means to said pulse applying means for interrupting operation of said pulse applying means to provide intervals between the pulse groups representing the digits of the code number, and control means actuated by said digit counter when the last stage thereof is actuated, said control means being connected to said pulse applying means for terminating operation thereof after the last pulse group has been applied.

7. A digital encoder system for producing a plurality of pulse groups in sequence corresponding to the digits of a particular code number, said encoder system including in combination, a multistage pulse counter, multivibrator means for applying regularly recurring pulses to said pulse counter, said stages of said pulse counter being energized in turn by said pulses, a digit counter having a number of stages corresponding to the number of digits in the code number, each of said stages of said digit counter including selectively operated input coupling means for receiving a pulse to energize said stage, said coupling means of each of said stages of said digit counter being connected to one stage of said pulse counter, each of said pulse counter stages when energized applying a voltage to said coupling means of said digit counter stage connected thereto for actuating the same, and timer means for applying pulses to said pulse counter and said digit counter after each group of pulses for resetting said pulse counter and for stepping said digit counter to the next stage when said coupling means thereof is actuated, means connecting said coupling means of said digit counter stages to said timer means, said coupling means of said digit counter stages applying pulses from the connected pulse counter stage to said timer means for actuating the same in response to groups of pulses corresponding to the digits of the particular code number, and means coupling said timer means to said multivibrator means for interrupting operation of said multivibrator means to provide intervals between the pulse groups representing the digits of the code number.

References Cited

UNITED STATES PATENTS

| | | | |
|---|---|---|---|
| 3,046,526 | 7/1962 | Scantlin | 340—164 X |
| 3,226,679 | 12/1965 | Malone | 340—164 |
| 3,299,403 | 1/1967 | Young | 340—164 |

JOHN W. CALDWELL, *Primary Examiner.*

THOMAS B. HABECKER, *Examiner.*

H. I. PITTS, *Assistant Examiner.*